W. G. STEPHAN & C. E. BEARD.
AUTOMATIC ELECTRIC EXCAVATING BUCKET.
APPLICATION FILED JULY 18, 1910.
1,043,640.
Patented Nov. 5, 1912.
2 SHEETS—SHEET 1.
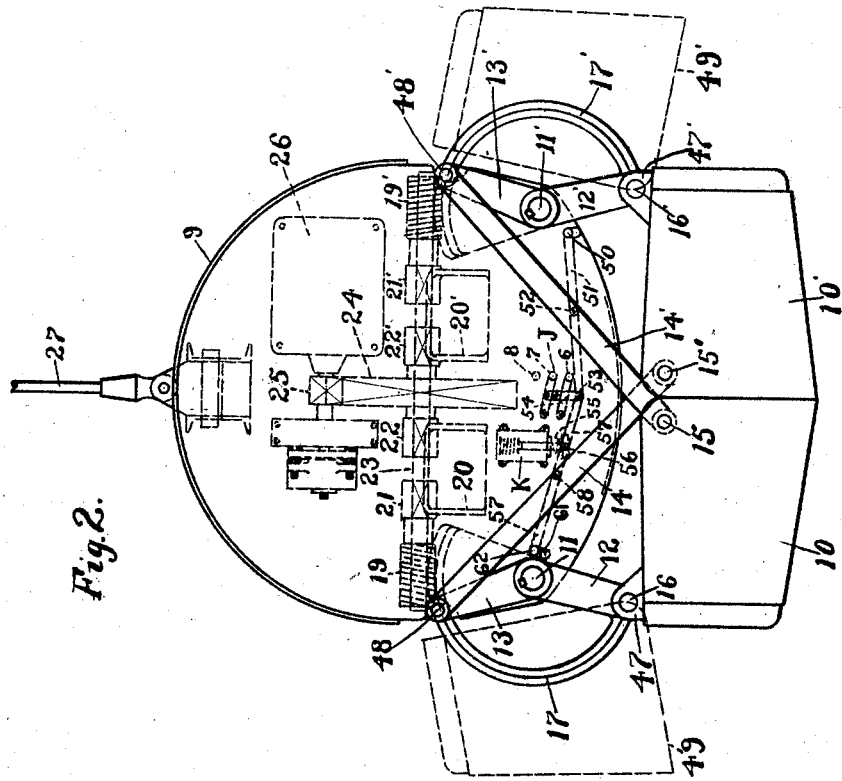
WITNESSES:
INVENTORS
Walter G. Stephan
Clement E. Beard
BY
Brown & Hopkins
ATTORNEYS

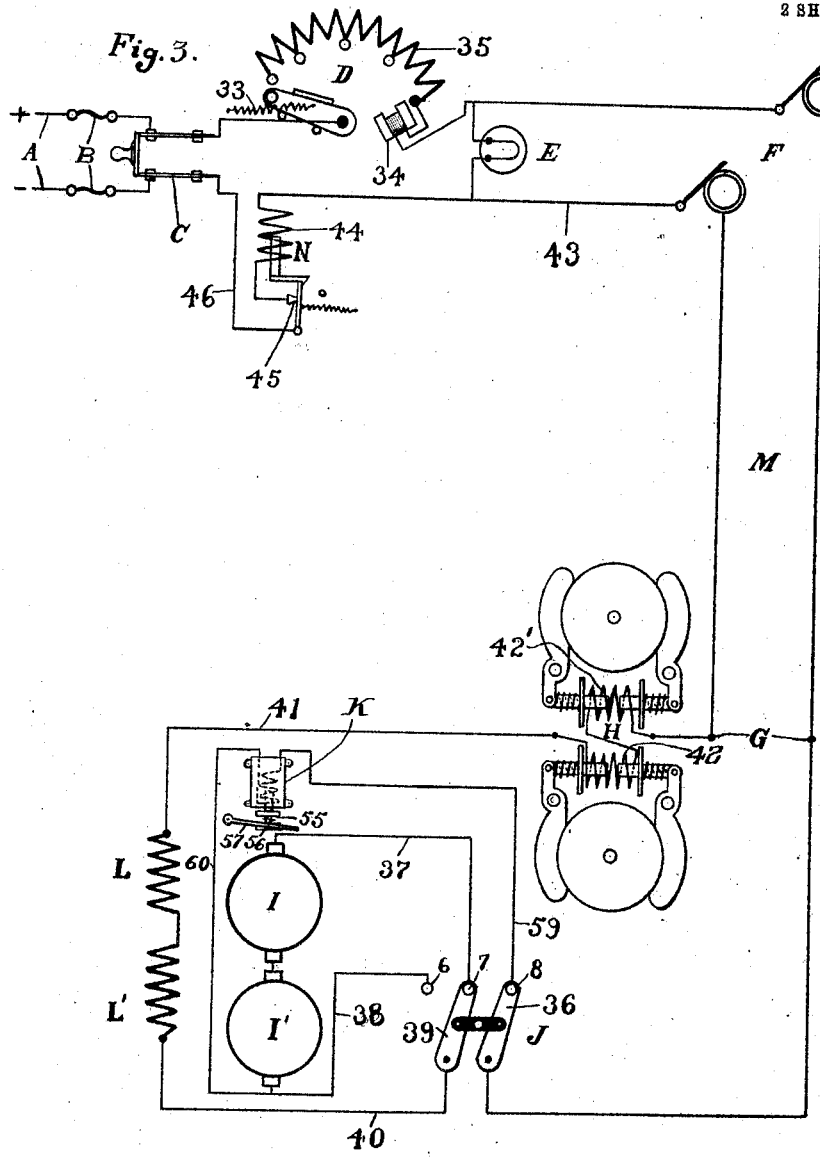

UNITED STATES PATENT OFFICE.

WALTER G. STEPHAN, OF CLEVELAND, AND CLEMENT E. BEARD, OF COLUMBIANA, OHIO.

AUTOMATIC ELECTRIC EXCAVATING-BUCKET.

1,043,640. Specification of Letters Patent. Patented Nov. 5, 1912.

Application filed July 18, 1910. Serial No. 572,540.

*To all whom it may concern:*

Be it known that we, WALTER G. STEPHAN and CLEMENT E. BEARD, citizens of the United States, and residing, respectively, at Cleveland, Ohio, and Columbiana, Ohio, have invented certain new and useful Improvements in Automatic Electric Excavating-Buckets, of which the following is a specification.
Our invention relates to means for operating excavating buckets of the clam-shell type, and one of its objects is to simplify the operation of excavating buckets and increase their efficiency by reducing the number of cables necessary to operate the bucket electrically, by obtaining perfect control from a distant point of all the movements of the bucket, no matter what its position, by increasing the speed of operation by eliminating hand brakes, clutches, etc., for operating the bucket, by lessening head room required for operation of the bucket and by securing other advantages.

A further object of the invention is the provision of automatic mechanism carried by the bucket for controlling one or more electric motors also carried by the bucket.

Other objects of the invention will appear more fully hereinafter, the novel combinations of elements being set forth in the appended claims.

In the accompanying drawings—Figure 1 shows a side view of a clam shell bucket and two electric motors within the same in dotted lines; Fig. 2 is a side view of Fig. 1, showing the bucket closed in full lines and open in dotted lines, and by additional dotted lines showing the interior motors and the automatic limit switch mechanism, overload device and reversing switch; Fig. 3 is a diagrammatic illustration of a system of circuits which may be employed in combination with our invention.

In Figs. 1 and 2 we have shown an excavating bucket of the clam shell type comprising shells 10 and $10^1$ suspended from the inclosing casing 9 by means of the rock shafts 11, $11^1$ and levers 12, $12^1$. Integral with the downwardly extending levers 12, $12^1$ are upwardly extending levers 13, $13^1$, respectively; to the upper ends of the latter are pivoted at 48, $48^1$ the links 14, $14^1$, the lower ends of which cross each other and are pivoted to upper inner corners of the shells 10, $10^1$ at 15, $15^1$, respectively, as shown in Fig. 2. As indicated in Fig. 1 the shafts 11, $11^1$ extend entirely through the lower portion of the casing 9 and the levers 12, 13 and $12^1$, $13^1$ are keyed thereto to rotate therewith and are located on the outside of the casing 9 there being a duplicate set of levers 12, 13, and $12^1$, $13^1$ on the opposite side of the casing from that shown in Fig. 2, and also a duplicate set of links 14, $14^1$ all similarly mounted to act in unison when the shells are to be opened or closed. Fixed to the lower ends of the levers 12, $12^1$ and extending transversely are the rods 16, $16^1$, respectively, to the outer ends of which are pivoted the ears 47, $47^1$ at the upper outside corners of the shells 10, $10^1$. To the shafts 11, $11^1$, midway between the ends thereof, so as to rotate therewith, are connected the segmental gears 17, $17^1$. The lower ends of these gears are connected as indicated at 18 in Fig. 1 to the shafts 16, $16^1$, respectively midway between the ends thereof. The upper side of the gears 17, $17^1$ are in mesh with the worms 19, $19^1$, respectively, which are carried at the ends of a shaft 23 mounted in suitable bearings 21, 22 and $21^1$, $22^1$ supported on the cross-pieces 20, $20^1$ extending from one wall of the casing 9 to the other horizontally and rigidly fastened to said walls. Intermediate the ends of the worm shaft 23 is connected a spur gear wheel 24 in mesh with which is a pinion 25 on the shaft of the motor 26, preferably an electric motor. We prefer to mount two electric motors 26, $26^1$ within the casing 9 by fastening the same rigidly to the walls thereof, as indicated in Fig. 1, and provide each of these motors with a pinion 25, $25^1$, respectively in mesh with the same gear wheel 24. When the electric motors are operated each drives its pinion in the same direction and each transmits motion to the gear wheel 24 which in turn rotates the worm shaft 23 to rotate the worms 19, $19^1$ and thus cause the segmental worm gears 17, $17^1$ to turn and open the shells to the dotted line positions 49, $49^1$ or close the same to the full line positions.

Whether electric motors are used or not we prefer to transmit the power to the motors through the interior of the haulage cables. In this instance we have shown two suspending cables 27, $27^1$ spaced apart and connected to the upper side of the casing 9. We employ two cables to prevent the bucket from rotating while being lifted and lowered. The construction and arrangement is such that the haulage cables or hoisting ropes 27, 27¹ may be wound on the hoisting drums of the cranes or loading and unloading apparatus.

In Fig. 3 we have illustrated the electric circuits and connections of an operating system which may be used in connection with our invention. A designates the mains or line wires which lead from any suitable source of electric current supply through the fuses B to the main line knife switch C. D designates an automatic no-voltage starting rheostat to which overload release mechanism may be added but we have in this instance shown a separate overload circuit breaker N. E is a pilot lamp of comparatively high resistance connected across the mains between the rheostat D and the hoisting mechanism. F designates contact or slip rings on the hoisting drum on which the cables 27, 27¹ are wound or unwound, the respective ends of said cables having their interior conductors connected to said slip rings. M designates the insulated wires in the haulage cables. G are the binding posts within the bucket shell. H designates the solenoid brake mechanism for the series wound electric motors, the armatures of which are indicated at I, I¹, and the field windings by the reference characters L, L¹. J is the pole changing or motor reversing switch controlled by the bucket mechanism as heretofore explained or by the solenoid magnet K upon overload as hereinafter described.

The operation of our automatic electric excavating bucket is as follows: Assuming that the shells are in closed position, as shown in full lines in Fig. 2, and it is desired to open the same, the main line switch C (Fig. 3) is closed and the lever of the rheostat D gradually moved against the action of the spring 33 over the contacts connected to the sectional starting resistance 35 until the lever rests against and is held by the magnet 34, the lever being constructed of iron or having an armature attached to the same. When the switch C is closed and the lever of the rheostat D moved onto the first live contact a circuit is established from one of the mains through the starting resistance 35, upper slip ring F, right-hand conductor M to the reversing switch J. When the bucket shells are in closed position the reversing switch J is on the contacts 6 and 7, and therefore the circuit will continue through the blade 36, contact 7, conductor 37, armatures I, I¹, conductor 38, contact 6, blade 39, conductor 40, field windings L¹, L, conductor 41, brake solenoids 42, 42¹, left-hand conductor M, lower slip ring F, conductor 43, solenoid 44 of the overload circuit breaker, contacts 45, conductor 46, and thence through the lower blade of switch C to the negative main. As soon as this circuit is established, the brakes of the motors 26, 26¹, within the casing 9 will be released and the motors will begin to rotate slowly and as the rheostat D is operated their speed will accelerate to full speed. As the motors rotate, motion is transmitted through the pinions 25, 25¹ to the gear wheel 24 which in turn imparts motion to the worm shaft 23. The worms 19, 19¹ will then positively actuate the segmental worm gears 17, 17¹ to rock the shafts 11, 11¹ and lift the shells 10, 10¹ by their ears 47, 47¹, respectively. At the same time the shells are pushed apart by the upper arms 13, 13¹ acting on the links 14, 14¹ which are pivoted at their upper ends at 48, 48¹ to the arms 13, 13¹, and at their lower ends to the shells 10, 10¹ at 15¹, 15, respectively.

In the opening operation of the bucket shells, when the latter approach their extreme open positions, as indicated by the dotted lines 49, 49¹, the right-hand lever 13¹ engages a pin 50 which extends outwardly through the casing 9 and is connected at its inner end to a lever 51, which is pivoted at 52 and has a pin and slot connection at 53 to a link 54 which is connected to the cross piece of the reversing switch J. When the lever 13¹ thus engages the pin 50 the lever 51 is tilted on its pivot 52 and the reversing switch J operated to the position shown in Fig. 3. In this operation the blades 39 and 36 are moved entirely off the contacts 6 and 7 before they engage the contacts 7 and 8, respectively. As soon as the blades 39 and 36 leave the contacts 6 and 7 the circuit is interrupted and the magnet 34 becomes deënergized allowing the spring 33 to cause the lever of the rheostat D to fly back to zero, open or neutral position and the motors remain stationary as the circuit is now also interrupted at the starting rheostat and the brakes are applied to the motors within the bucket and their rotation is stopped. The two solenoid brake magnets being in series with the motors operate automatically to stop the motors when no current is flowing; and furthermore because of this series connection of the brake magnets the brakes will be released only when the motors also receive current for starting. We do not wish to be limited to this particular arrangement, however, although we deem it preferable, as in some instances a shunt wound electric motor could be used and the brake magnet connected in shunt to the conductors M.

It should be noted that the emergency solenoid K has not been in circuit during the opening of the shells but when the reversing switch J has been moved into its position shown in Fig. 3, the solenoid K is connected in circuit between the motor armatures I¹ and the contact 8 by the conductors 59 and 60. The spring 55 between the magnet K and the pivot 56 acts on the lever 57 tending to press it down and through the pin and slot connection 53 reverse the position of the reversing switch J. The arm 13¹ resting against the pin 50 and being held there, holds the reversing switch J in the position indicated in Fig. 3.

Now, while the bucket is fully open, if it is desired to close the shells, the operator at the starting box D moves the lever to on position thus establishing a circuit, but as to the armatures I, I¹ in a reverse direction. This circuit is from the positive main through the starting resistance D, conductor M, blade 36, conductor 59, solenoid K, conductor 60, armatures I¹, I, conductor 37, blade 39, conductor 40, field windings L¹, L, conductor 41, brake solenoids 42, 42¹, conductor M, conductor 43, and thence through the overload circuit breaker to the negative main. The magnet K being immediately energized will hold the reversing switch J in its upper position against the action of the spring 55. The brakes of the motors being released the latter will rotate and as the starting resistance 35 is cut, will increase in speed. The motors now rotate in the opposite direction to close the shells and will continue to rotate until a dog 61 on the left bucket arm lifts the lug 62 on the switch arm 57 which is pivoted to the casing 9 at 58. This takes place when the bucket is fully closed and moves the armature or plunger of the magnet K down and also the reversing switch J. The latter, when in its intermediate position, interrupts the circuit and causes the magnet 34 to become deënergized and therefore release the arm of the rheostat D to initial or open position, as indicated in Fig. 3. When fully closed and carrying a load the bucket is effectually locked in closed position by the worm gearing connections between the motors and the shells.

If there should be an overload in the bucket or if the shells should in closing bite a solid substance, the increased current due to the decrease in the counter electro-motive force in the motors within the bucket, will cause the circuit breaker N to separate the contacts 45 and thus interrupt the circuit and prevent damage to the motors. The lever of the rheostat D flies back to initial position, the brakes of the motors are applied and the motors stopped. The magnet K being deënergized by this operation the reversing switch J will be reversed so that upon reëstablishment of the circuit to the motors, the shells will move away from the obstruction. The operation of closing the shells to grab another load may then be repeated without causing an overload.

Obviously, those skilled in the art may make various changes in the details and arrangement of parts without departing from the spirit and scope of our invention as defined by the claims and we wish therefore not to be limited to the precise construction herein disclosed.

Having thus fully described our invention, what we claim and desire to have secured by Letters Patent of the United States is:—

1. The combination with a clam-shell bucket, of an electric motor carried thereby, driving connections between said motor and the shells of said bucket, a reversing switch for said motor and also carried by said bucket, and automatic means on the bucket for operating said reversing switch.

2. The combination with a clam-shell bucket, of an electric motor carried thereby, connections between said motor and the jaws of said bucket to open and close the same, a reversing switch carried by the bucket, and mechanism coacting with the relatively movable parts of said bucket to automatically operate said reversing switch.

3. The combination with a clam-shell bucket, of a casing connected thereto, an electric motor within the casing, worm gearing for transmitting motion from said motor to the shells of said bucket, a reversing switch for the motor and carried by said bucket, and automatic means for operating said reversing switch.

4. The combination with a clam-shell bucket, of an electric motor carried thereby, operating connections between said motor and the jaws of said bucket, means for automatically stopping the motor upon overload, a reversing switch for said electric motor and carried by said bucket, and automatic mechanism for setting said reversing switch in such position that upon re-supplying said motor with current the bucket will be moved to fully open position.

5. The combination with a clam-shell bucket, of an electric motor carried thereby, worm gearing connections between said motor and the shells of said bucket, a motor reversing switch carried by the bucket, and means also carried by the bucket for automatically operating said reversing switch.

6. The combination with a clam-shell bucket, of an electric motor for operating the same, a reversing switch for said motor, means actuated by the movement of the jaws of said bucket for operating said reversing switch, and a vertically arranged electro-magnet for holding said reversing switch in one of its positions after said means becomes ineffective, said reversing switch automatically assuming its other position when said electro-magnet becomes deënergized.

7. The combination with a clam-shell bucket, of an electric motor carried thereby, a reversing switch for said electric motor, driving connections between said motor and the shells of said bucket, mechanism co-acting with said connections for operating said reversing switch when the bucket is fully closed or fully open, and an electro-magnet for holding the reversing switch in one of its positions when said reversing switch operating mechanism is released by the movement of said shells from fully open or fully closed position.

8. The combination with a clam shell excavating bucket, of an electric motor carried thereby, operating connections between said motor and the shells of said bucket, a reversing switch for said motor, means for operating said reversing switch and effecting the stopping of said motor when the bucket is entirely open or entirely closed, a magnet operatively connected to said reversing switch, and a spring for moving said reversing switch to initial position upon deënergization of said magnet.

9. The combination with a clam shell bucket, of an electric motor carried thereby, operating connections between said motor and the shells of said bucket, a reversing switch for the motor and carried by said bucket, mechanism co-acting with the shells of said bucket for automatically stopping the motor when the bucket is entirely open, a magnet for holding during the closing of the bucket said reversing switch in the position in which it is put by said stopping mechanism, and means for operating said reversing switch and stopping the motor when the bucket is entirely closed.

10. The combination with a clam-shell bucket, of an electric motor carried thereby, driving connections between said motor and the shells of said bucket, an electro-mechanical brake for said motor, means for effecting the application of the brake to stop the motor when the bucket is entirely opened or entirely closed, a reversing switch carried by the bucket, and automatic mechanism for placing said reversing switch in such position as to effect a reversal of the motor upon reëstablishment of the current.

11. The combination with a clam shell bucket, of an electric motor carried thereby, driving connections between said motor and the shells of said bucket, a reversing switch carried by said bucket, levers pivoted to said bucket and connected to said reversing switch, one of said levers being actuated when the bucket is entirely open and the other being actuated when the bucket is entirely closed, and an electro-magnet for holding said reversing switch in the position in which it was put by the complete opening of the bucket.

12. The combination with a clam shell bucket, of an electric motor carried thereby, driving connections between said motor and the shells of said bucket, a reversing switch for the motor, mechanism co-acting with said connections for positively moving said reversing switch to one of its positions when the bucket is entirely open, an electro-magnet for holding said reversing switch in such position when said moving mechanism is released by the return of said shells toward closed position, means for automatically effecting the deënergization of the said electro-magnet when the shells are obstructed in the closing operation, and a spring for moving the reversing switch to its other position when the said electro-magnet is deenergized.

In testimony whereof we have signed our names to this specification, in the presence of two subscribing witnesses, on this fifteenth day of July A. D. 1910.

WALTER G. STEPHAN.
CLEMENT E. BEARD.

Witnesses:
  Geo. A. Welch,
  D. O. McHugh.